(12) United States Patent
Tremaine

(10) Patent No.: US 7,636,813 B2
(45) Date of Patent: Dec. 22, 2009

(54) SYSTEMS AND METHODS FOR PROVIDING REMOTE PRE-FETCH BUFFERS

(75) Inventor: Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/419,586

(22) Filed: May 22, 2006

(65) Prior Publication Data

US 2008/0005479 A1    Jan. 3, 2008

(51) Int. Cl.
G06F 13/18    (2006.01)
G06F 13/374    (2006.01)

(52) U.S. Cl. ............... 711/137; 711/105; 710/4
(58) Field of Classification Search ........... 711/137, 711/104, 105; 710/4, 311
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 |
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/900 |
| 4,796,231 A | 1/1989 | Pinkham | 365/189.05 |
| 4,803,485 A | 2/1989 | Rypinkski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |

(Continued)

FOREIGN PATENT DOCUMENTS

EP    0229316 A2    7/1987

(Continued)

OTHER PUBLICATIONS

Boudon, et al., "Novel Bus Reconfiguration Scheme With Spare Lines", IBM Technical Disclosure Bulletin, May 1987, vol. 29, No. 12, pp. 1-3.

(Continued)

*Primary Examiner*—Matt Kim
*Assistant Examiner*—Hal Schnee
(74) *Attorney, Agent, or Firm*—Cantor Colburn LLP

(57) ABSTRACT

Systems and methods for providing remote pre-fetch buffers. The systems include a computer memory system with a memory controller, one or more memory busses connected to the memory controller, and at least one memory subsystem in communication with the memory controller via the memory busses. The memory controller generates, receives and responds to memory access requests including unsolicited data transfers. The memory subsystem includes one or more memory devices and logic to initiate an unsolicited data transfer to the memory controller based on analysis performed at the memory subsystem of prior memory access requests received by the memory subsystem.

17 Claims, 9 Drawing Sheets

U.S. PATENT DOCUMENTS

| | | | |
|---|---|---|---|
| 4,985,828 A | 1/1991 | Shimizu et al. ............. 364/200 |
| 5,053,947 A | 10/1991 | Heibel et al. ................ 364/200 |
| 5,177,375 A | 1/1993 | Ogawa et al. |
| 5,206,946 A | 4/1993 | Brunk ............................ 710/2 |
| 5,214,747 A | 5/1993 | Cok ............................. 395/27 |
| 5,265,049 A | 11/1993 | Takasugi |
| 5,265,212 A | 11/1993 | Bruce, II ................... 710/113 |
| 5,287,531 A | 2/1994 | Rogers, Jr. et al. .......... 395/800 |
| 5,347,270 A | 9/1994 | Matsuda et al. ............ 340/2.21 |
| 5,357,621 A | 10/1994 | Cox |
| 5,375,127 A | 12/1994 | Leak et al. |
| 5,387,911 A | 2/1995 | Gleichert et al. .............. 341/95 |
| 5,394,535 A | 2/1995 | Ohuchi ........................ 711/155 |
| 5,454,091 A | 9/1995 | Sites et al. ................... 395/413 |
| 5,475,690 A | 12/1995 | Burns et al. .............. 370/105.3 |
| 5,513,135 A | 4/1996 | Dell et al. ...................... 365/52 |
| 5,517,626 A | 5/1996 | Archer et al. |
| 5,522,064 A | 5/1996 | Aldereguia et al. |
| 5,544,309 A | 8/1996 | Chang et al. |
| 5,546,023 A | 8/1996 | Borkar et al. |
| 5,561,826 A | 10/1996 | Davies et al. |
| 5,592,632 A | 1/1997 | Leung et al. ................ 395/306 |
| 5,594,925 A | 1/1997 | Harder et al. |
| 5,611,055 A | 3/1997 | Krishan et al. .............. 395/281 |
| 5,613,077 A | 3/1997 | Leung et al. ................ 395/306 |
| 5,627,963 A | 5/1997 | Gabillard et al. .............. 714/42 |
| 5,629,685 A | 5/1997 | Allen et al. ............... 340/825.02 |
| 5,661,677 A | 8/1997 | Rondeau, II et al. .......... 365/63 |
| 5,666,480 A | 9/1997 | Leung et al. ................ 395/180 |
| 5,684,418 A | 11/1997 | Yanagiuchi |
| 5,706,346 A | 1/1998 | Katta et al. |
| 5,754,804 A | 5/1998 | Cheselka et al. |
| 5,764,155 A | 6/1998 | Kertesz et al. ......... 340/825.08 |
| 5,822,749 A | 10/1998 | Agarwal ......................... 707/2 |
| 5,852,617 A | 12/1998 | Mote, Jr. ...................... 714/726 |
| 5,870,325 A | 2/1999 | Nielsen et al. ................ 365/63 |
| 5,872,996 A | 2/1999 | Barth et al. .................. 395/853 |
| 5,917,760 A | 6/1999 | Millar |
| 5,926,838 A | 7/1999 | Jeddeloh ...................... 711/167 |
| 5,928,343 A | 7/1999 | Farmwald et al. ........... 710/104 |
| 5,930,273 A | 7/1999 | Mukojima .................. 714/776 |
| 5,959,914 A | 9/1999 | Gates et al. |
| 5,973,951 A | 10/1999 | Bechtolsheim et al. ........ 365/52 |
| 5,974,493 A | 10/1999 | Okumura et al. ............ 710/307 |
| 5,995,405 A | 11/1999 | Trick ............................ 365/63 |
| 6,003,121 A | 12/1999 | Wirt |
| 6,011,732 A | 1/2000 | Harrison et al. |
| 6,038,132 A | 3/2000 | Tokunaga et al. ............ 361/760 |
| 6,049,476 A | 4/2000 | Laudon et al. ................ 365/52 |
| 6,076,158 A | 6/2000 | Sites et al. .................... 712/230 |
| 6,078,515 A | 6/2000 | Nielsen et al. ................ 365/63 |
| 6,081,868 A | 6/2000 | Brooks |
| 6,085,276 A | 7/2000 | VanDoren et al. |
| 6,096,091 A | 8/2000 | Hartmann .................... 716/17 |
| 6,128,746 A | 10/2000 | Clark et al. .................. 713/324 |
| 6,145,028 A | 11/2000 | Shank et al. |
| 6,170,047 B1 | 1/2001 | Dye ............................ 711/170 |
| 6,170,059 B1 | 1/2001 | Pruett et al. ................. 713/200 |
| 6,173,382 B1 | 1/2001 | Dell et al. ................... 711/170 |
| 6,185,718 B1 | 2/2001 | Dell et al. |
| 6,198,304 B1 | 3/2001 | Sasaki |
| 6,215,686 B1 | 4/2001 | Deneroff et al. .............. 365/52 |
| 6,219,288 B1 | 4/2001 | Braceras et al. |
| 6,219,760 B1 * | 4/2001 | McMinn ..................... 711/137 |
| 6,233,639 B1 | 5/2001 | Dell et al. |
| 6,260,127 B1 | 7/2001 | Olarig et al. ................ 711/167 |
| 6,262,493 B1 | 7/2001 | Garnett |
| 6,285,172 B1 | 9/2001 | Torbey |
| 6,292,903 B1 | 9/2001 | Coteus et al. ................ 713/401 |
| 6,301,636 B1 | 10/2001 | Schultz et al. .............. 711/108 |
| 6,308,247 B1 | 10/2001 | Ackerman et al. |
| 6,317,352 B1 | 11/2001 | Halbert et al. ................. 365/52 |
| 6,321,343 B1 | 11/2001 | Toda ........................... 713/600 |
| 6,338,113 B1 | 1/2002 | Kubo et al. .................. 711/105 |
| 6,349,390 B1 | 2/2002 | Dell et al. |
| 6,357,018 B1 | 3/2002 | Stuewe et al. |
| 6,370,631 B1 | 4/2002 | Dye ............................ 711/170 |
| 6,378,018 B1 | 4/2002 | Tsern et al. .................. 710/129 |
| 6,381,685 B2 | 4/2002 | Dell et al. |
| 6,393,512 B1 | 5/2002 | Chen et al. |
| 6,393,528 B1 | 5/2002 | Arimilli et al. .............. 711/137 |
| 6,408,398 B1 | 6/2002 | Frecker et al. |
| 6,425,044 B1 | 7/2002 | Jeddeloh |
| 6,446,174 B1 | 9/2002 | Dow |
| 6,467,013 B1 | 10/2002 | Nizar |
| 6,473,836 B1 | 10/2002 | Ikeda .......................... 711/137 |
| 6,477,614 B1 | 11/2002 | Leddige et al. |
| 6,483,755 B2 | 11/2002 | Leung et al. ............ 365/189.05 |
| 6,484,271 B1 | 11/2002 | Gray |
| 6,487,102 B1 | 11/2002 | Halbert et al. |
| 6,487,627 B1 | 11/2002 | Willke et al. ................ 710/306 |
| 6,493,250 B2 | 12/2002 | Halbert et al. ................. 365/63 |
| 6,496,540 B1 | 12/2002 | Widmer ....................... 375/242 |
| 6,496,910 B1 | 12/2002 | Baentsch et al. ............ 711/165 |
| 6,499,070 B1 | 12/2002 | Whetsel |
| 6,502,161 B1 | 12/2002 | Perego et al. ................... 711/5 |
| 6,507,888 B2 | 1/2003 | Wu et al. ..................... 711/105 |
| 6,510,100 B2 | 1/2003 | Grundon et al. ............. 365/233 |
| 6,513,091 B1 | 1/2003 | Blackmon et al. ........... 710/316 |
| 6,530,007 B2 | 3/2003 | Olarig |
| 6,532,525 B1 | 3/2003 | Aleksic et al. ............... 711/168 |
| 6,546,359 B1 | 4/2003 | Week .......................... 702/186 |
| 6,549,971 B1 | 4/2003 | Cecchi et al. ................ 710/306 |
| 6,553,450 B1 | 4/2003 | Dodd et al. .................. 711/105 |
| 6,557,069 B1 | 4/2003 | Drehmel et al. ............. 710/307 |
| 6,564,329 B1 | 5/2003 | Cheung et al. .............. 713/322 |
| 6,584,576 B1 | 6/2003 | Co |
| 6,587,912 B2 | 7/2003 | Leddige |
| 6,590,827 B2 | 7/2003 | Chang et al. |
| 6,594,713 B1 | 7/2003 | Fuocco et al. |
| 6,594,748 B1 | 7/2003 | Lin |
| 6,601,121 B2 | 7/2003 | Singh et al. .................. 710/112 |
| 6,601,149 B1 | 7/2003 | Brock et al. |
| 6,604,180 B2 | 8/2003 | Jeddeloh |
| 6,611,902 B2 | 8/2003 | Kuroda et al. ............... 711/167 |
| 6,622,217 B2 | 9/2003 | Barroso et al. .............. 711/141 |
| 6,622,227 B2 | 9/2003 | Zumkehr et al. |
| 6,625,687 B1 | 9/2003 | Halbert et al. .............. 711/105 |
| 6,625,702 B2 | 9/2003 | Rentschler et al. |
| 6,628,538 B2 | 9/2003 | Funaba et al. ................. 365/63 |
| 6,631,439 B2 | 10/2003 | Saulsbury et al. ........... 711/104 |
| 6,636,957 B2 | 10/2003 | Stevens et al. |
| 6,643,745 B1 | 11/2003 | Palanca et al. |
| 6,671,376 B1 | 12/2003 | Koto et al. ................... 380/210 |
| 6,678,811 B2 | 1/2004 | Rentschler et al. .......... 711/167 |
| 6,681,292 B2 | 1/2004 | Creta et al. |
| 6,684,320 B2 | 1/2004 | Mohamed et al. |
| 6,697,919 B2 | 2/2004 | Gharachorloo et al. ...... 711/141 |
| 6,704,842 B1 | 3/2004 | Janakiraman et al. ....... 711/141 |
| 6,721,185 B2 | 4/2004 | Dong et al. |
| 6,721,944 B2 | 4/2004 | Chaudhry et al. ........... 717/154 |
| 6,738,836 B1 | 5/2004 | Kessler et al. ................ 710/22 |
| 6,741,096 B2 | 5/2004 | Moss |
| 6,748,518 B1 | 6/2004 | Guthrie et al. |
| 6,754,762 B1 | 6/2004 | Curley |
| 6,766,389 B2 | 7/2004 | Hayter et al. .................. 710/62 |
| 6,775,747 B2 | 8/2004 | Venkatraman .............. 711/137 |
| 6,791,555 B1 | 9/2004 | Radke et al. ................ 345/532 |
| 6,792,495 B1 | 9/2004 | Garney et al. |
| 6,799,241 B2 | 9/2004 | Kahn et al. |
| 6,839,393 B1 | 1/2005 | Sidiropoulos ............... 375/371 |
| 6,877,076 B1 | 4/2005 | Cho et al. .................... 711/157 |
| 6,877,078 B2 | 4/2005 | Fujiwara et al. ............. 711/167 |
| 6,882,082 B2 | 4/2005 | Greeff et al. |

| | | |
|---|---|---|
| 6,889,284 B1 | 5/2005 | Nizar et al. ............... 710/315 |
| 6,898,726 B1 | 5/2005 | Lee |
| 6,910,146 B2 | 6/2005 | Dow |
| 6,918,068 B2 | 7/2005 | Vail et al. |
| 6,938,119 B2 | 8/2005 | Kohn et al. |
| 6,944,084 B2 | 9/2005 | Wilcox |
| 6,948,091 B2 | 9/2005 | Bartels et al. |
| 6,949,950 B2 | 9/2005 | Takahashi et al. ............ 326/37 |
| 6,965,952 B2 | 11/2005 | Echartea et al. |
| 6,977,536 B2 | 12/2005 | Chin-Chieh et al. ......... 327/116 |
| 6,993,612 B2 | 1/2006 | Porterfield |
| 6,996,639 B2 | 2/2006 | Narad |
| 7,039,755 B1 | 5/2006 | Helms |
| 7,047,370 B1* | 5/2006 | Jeter et al. ............... 711/154 |
| 7,047,371 B2 | 5/2006 | Dortu |
| 7,047,384 B2 | 5/2006 | Bodas et al. |
| 7,076,700 B2 | 7/2006 | Rieger |
| 7,103,792 B2 | 9/2006 | Moon |
| 7,120,743 B2 | 10/2006 | Meyer et al. |
| 7,133,790 B2 | 11/2006 | Liou |
| 7,133,972 B2 | 11/2006 | Jeddeloh |
| 7,177,211 B2 | 2/2007 | Zimmerman |
| 7,194,593 B2 | 3/2007 | Schnepper |
| 7,197,594 B2 | 3/2007 | Raz et al. |
| 7,203,318 B2 | 4/2007 | Collum et al. |
| 7,206,887 B2 | 4/2007 | Jeddeloh |
| 7,206,962 B2 | 4/2007 | Deegan |
| 7,210,059 B2 | 4/2007 | Jeddeloh |
| 7,216,196 B2 | 5/2007 | Jeddeloh |
| 7,216,276 B1 | 5/2007 | Azimi et al. |
| 7,222,213 B2 | 5/2007 | James |
| 7,227,949 B2 | 6/2007 | Heegard et al. |
| 7,240,145 B2* | 7/2007 | Holman ..................... 711/5 |
| 7,260,685 B2 | 8/2007 | Lee et al. |
| 7,266,634 B2 | 9/2007 | Ware et al. |
| 7,296,129 B2 | 11/2007 | Gower et al. |
| 7,313,583 B2 | 12/2007 | Porten et al. |
| 7,321,979 B2 | 1/2008 | Lee |
| 7,353,316 B2 | 4/2008 | Erdmann |
| 7,363,419 B2 | 4/2008 | Cronin et al. |
| 7,363,436 B1 | 4/2008 | Yeh et al. |
| 7,370,134 B2 | 5/2008 | Jeddeloh |
| 7,386,575 B2 | 6/2008 | Bashant et al. |
| 7,418,526 B2 | 8/2008 | Jeddeloh |
| 7,421,525 B2 | 9/2008 | Polzin et al. |
| 7,433,258 B2 | 10/2008 | Rao et al. |
| 2001/0000822 A1 | 5/2001 | Dell et al. ............... 711/170 |
| 2001/0003839 A1 | 6/2001 | Kondo ................... 711/144 |
| 2001/0029566 A1 | 10/2001 | Shin |
| 2002/0019926 A1 | 2/2002 | Huppenthal et al. ......... 712/15 |
| 2002/0038405 A1 | 3/2002 | Leddige et al. ............ 711/115 |
| 2002/0059439 A1 | 5/2002 | Arroyo et al. |
| 2002/0083255 A1 | 6/2002 | Greeff et al. .............. 710/305 |
| 2002/0103988 A1 | 8/2002 | Dornier ................... 712/38 |
| 2002/0112119 A1 | 8/2002 | Halbert et al. ............ 711/115 |
| 2002/0112194 A1 | 8/2002 | Uzelac ................... 713/500 |
| 2002/0124195 A1 | 9/2002 | Nizar ..................... 713/320 |
| 2002/0124201 A1 | 9/2002 | Edwards et al. |
| 2002/0147898 A1 | 10/2002 | Rentschler et al. .......... 711/170 |
| 2002/0174274 A1 | 11/2002 | Wu et al. ................ 710/100 |
| 2003/0009632 A1 | 1/2003 | Arimilli et al. |
| 2003/0028701 A1 | 2/2003 | Rao et al. |
| 2003/0033364 A1 | 2/2003 | Garnett et al. ............. 709/203 |
| 2003/0051055 A1* | 3/2003 | Parrella et al. ............. 709/246 |
| 2003/0056183 A1 | 3/2003 | Kobayashi |
| 2003/0084309 A1 | 5/2003 | Kohn ..................... 713/189 |
| 2003/0090879 A1 | 5/2003 | Doblar et al. ............. 361/728 |
| 2003/0105938 A1* | 6/2003 | Cooksey et al. ............ 711/203 |
| 2003/0118044 A1 | 6/2003 | Blanc et al. |
| 2003/0126354 A1 | 7/2003 | Kahn et al. |
| 2003/0126355 A1* | 7/2003 | David ..................... 711/105 |
| 2003/0126363 A1 | 7/2003 | David |
| 2003/0223303 A1 | 12/2003 | Lamb et al. ............ 365/230.06 |
| 2003/0229770 A1 | 12/2003 | Jeddeloh |
| 2003/0235222 A1 | 12/2003 | Bridges et al. |
| 2003/0236959 A1 | 12/2003 | Johnson et al. ............ 711/167 |
| 2004/0006674 A1 | 1/2004 | Hargis et al. .............. 711/156 |
| 2004/0015650 A1 | 1/2004 | Zumkehr et al. |
| 2004/0049723 A1 | 3/2004 | Obara ..................... 714/729 |
| 2004/0078615 A1 | 4/2004 | Martin et al. |
| 2004/0098546 A1 | 5/2004 | Bashant et al. |
| 2004/0098549 A1 | 5/2004 | Dorst |
| 2004/0117588 A1 | 6/2004 | Arimilli et al. ............. 711/203 |
| 2004/0123222 A1 | 6/2004 | Widmer |
| 2004/0128474 A1 | 7/2004 | Vorbach ..................... 712/10 |
| 2004/0148482 A1 | 7/2004 | Grundy et al. |
| 2004/0160832 A1 | 8/2004 | Janzen et al. |
| 2004/0163028 A1 | 8/2004 | Olarig |
| 2004/0165609 A1* | 8/2004 | Herbst et al. ............. 370/412 |
| 2004/0199363 A1* | 10/2004 | Bohizic et al. ............. 702/186 |
| 2004/0205433 A1 | 10/2004 | Gower et al. |
| 2004/0230718 A1 | 11/2004 | Polzin et al. .................. 710/22 |
| 2004/0246767 A1 | 12/2004 | Vogt ..................... 365/154 |
| 2004/0250153 A1 | 12/2004 | Vogt ..................... 713/500 |
| 2004/0260909 A1 | 12/2004 | Lee et al. .................... 711/213 |
| 2004/0260957 A1 | 12/2004 | Jeddeloh et al. ............ 713/300 |
| 2005/0023560 A1 | 2/2005 | Ahn et al. ................ 257/200 |
| 2005/0027941 A1* | 2/2005 | Wang et al. ................. 711/121 |
| 2005/0033906 A1 | 2/2005 | Mastronarde et al. |
| 2005/0044305 A1 | 2/2005 | Jakobs et al. |
| 2005/0050237 A1 | 3/2005 | Jeddeloh et al. ............... 710/10 |
| 2005/0050255 A1 | 3/2005 | Jeddeloh ................. 710/317 |
| 2005/0066133 A1 | 3/2005 | Schnepper ................ 711/154 |
| 2005/0071542 A1* | 3/2005 | Weber et al. ............... 711/105 |
| 2005/0071707 A1 | 3/2005 | Hampel |
| 2005/0078506 A1 | 4/2005 | Rao et al. |
| 2005/0080581 A1 | 4/2005 | Zimmerman et al. ......... 702/117 |
| 2005/0081129 A1 | 4/2005 | Shah et al. |
| 2005/0086424 A1 | 4/2005 | Oh et al. |
| 2005/0086441 A1 | 4/2005 | Myer et al. |
| 2005/0097249 A1 | 5/2005 | Oberlin et al. |
| 2005/0105350 A1 | 5/2005 | Zimmerman et al. |
| 2005/0120157 A1 | 6/2005 | Chen et al. ............... 710/313 |
| 2005/0125702 A1 | 6/2005 | Huang et al. ................ 713/320 |
| 2005/0125703 A1 | 6/2005 | Lefurgy et al. .............. 713/320 |
| 2005/0138246 A1 | 6/2005 | Chen et al. |
| 2005/0138267 A1 | 6/2005 | Bains et al. |
| 2005/0144399 A1 | 6/2005 | Hosomi ................... 711/145 |
| 2005/0149665 A1* | 7/2005 | Wolrich et al. ............. 711/105 |
| 2005/0166006 A1 | 7/2005 | Talbot et al. |
| 2005/0177677 A1 | 8/2005 | Jeddeloh |
| 2005/0177690 A1 | 8/2005 | LaBerge .................. 711/154 |
| 2005/0204216 A1 | 9/2005 | Daily et al. ................ 714/724 |
| 2005/0216678 A1 | 9/2005 | Jeddeloh |
| 2005/0220097 A1 | 10/2005 | Swami et al. |
| 2005/0223196 A1 | 10/2005 | Knowles |
| 2005/0229132 A1 | 10/2005 | Butt et al. ..................... 716/10 |
| 2005/0248997 A1 | 11/2005 | Lee |
| 2005/0257005 A1 | 11/2005 | Jeddeloh |
| 2005/0259496 A1 | 11/2005 | Hsu et al. ................. 365/226 |
| 2005/0289292 A1 | 12/2005 | Morrow et al. |
| 2005/0289377 A1 | 12/2005 | Luong |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1* | 4/2006 | Huggahalli et al. .......... 711/137 |
| 2006/0095592 A1 | 5/2006 | Borkenhagen |
| 2006/0095679 A1* | 5/2006 | Edirisooriya ............... 711/137 |
| 2006/0107175 A1 | 5/2006 | Dell et al. |
| 2006/0112238 A1* | 5/2006 | Jamil et al. ............... 711/145 |
| 2006/0161733 A1* | 7/2006 | Beckett et al. ............. 711/118 |
| 2006/0162882 A1 | 7/2006 | Ohara et al. |
| 2006/0168407 A1 | 7/2006 | Stern |
| 2006/0179208 A1 | 8/2006 | Jeddeloh |
| 2006/0190674 A1 | 8/2006 | Poechmueller |
| 2006/0195631 A1* | 8/2006 | Rajamani .................... 710/51 |

| | | | |
|---|---|---|---|
| 2006/0206742 | A1 | 9/2006 | James |
| 2006/0212666 | A1 | 9/2006 | Jeddeloh |
| 2006/0224764 | A1 | 10/2006 | Shinohara et al. |
| 2006/0277365 | A1 | 12/2006 | Pong |
| 2006/0288172 | A1 | 12/2006 | Lee et al. |
| 2007/0005922 | A1 | 1/2007 | Swaminathan et al. |
| 2007/0025304 | A1* | 2/2007 | Leelahakriengkrai et al. .... 370/338 |
| 2007/0038907 | A1 | 2/2007 | Jeddeloh et al. |
| 2007/0067382 | A1* | 3/2007 | Sun ............................ 709/203 |
| 2007/0083701 | A1 | 4/2007 | Kapil |
| 2007/0160053 | A1 | 7/2007 | Coteus |
| 2008/0043808 | A1 | 2/2008 | Hsu et al. |
| 2008/0162807 | A1 | 7/2008 | Rothman et al. |
| 2008/0222379 | A1 | 9/2008 | Jeddeloh |

FOREIGN PATENT DOCUMENTS

| | | |
|---|---|---|
| EP | 0470734 A1 | 2/1992 |
| EP | 0899743 A2 | 6/1998 |
| EP | 1429340 A2 | 6/2004 |
| GB | 2396711 A | 6/2004 |
| JP | 59153353 A | 9/1984 |
| JP | 0114140 A | 6/1989 |
| JP | 0432614 | 11/1992 |
| JP | 10011971 | 1/1998 |
| JP | 2004139552 A | 5/2004 |
| JP | 2008003711 A | 1/2008 |
| WO | 9621188 | 7/1996 |
| WO | 9812651 | 3/1998 |
| WO | 0223353 A2 | 3/2002 |
| WO | WO2005038660 | 4/2005 |
| WO | 2007109888 | 10/2007 |

OTHER PUBLICATIONS

NB940259 (IBM Technical Disclosure Bulletin, Feb. 1994; vol. 37; pp. 59-64).

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586, filed May 22, 2006. Robert Tremaine. "Systems and Methods for Providing Remote Pre-Fetch Buffers".

Wikipedia, Serial Communications, [online], [retrieved Apr. 10, 2007 from the Internet], http://en.wikipedia.org/wiki/Serial_communications, 3 pages.

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.

Seceleanu et al.; "Segment Arbiter as Action System;" IEEE 2003 pp. 249-252.

Understanding System Memory and CPU Speeds: A Layman'S Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No, 2, May 2001, pp. 111-170.

Wang, et al., "Guided Region Prefetching: A Cooperative Hardware/Software Approach", pp. 388-398.

Natarajan, et al., "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Massoud Pedram, "Power Minimization in IC Design Principles and Applications", ACM Transactions on Design Automation of Electronic Systems vol. 1, No. 1, Jan. 1996, pp. 3-56.

P.R. Panda, "Data and Memory Optimization Techniques For Embedded Systems", ACM Transactions on Design Automation of Electronic Systems, vol. 6, No. 2, Apr. 2001, pp. 149-206.

Luca Benini, et al., "System-Level Powers Optimization: Techniques and Tools", ACM Transactions on Design Automation of Electronic Systems, vol. 5, No. 2, Apr. 2000, pp. 115-192.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

PCT Search Report. PCT/EP2007/057915. Mailed Nov. 7, 2007.

International Search Report, International Application No. PCT/EP2007/054929, International Publication No. WO 2007/135144 A1, received Mar. 21, 2008.

PCT International Search Report PCT/EP2006/068984. Mailed Feb. 16, 2007.

PCT International Search Report PCT/EP2007/057916. Mailed Dec. 14, 2007.

Yang, Q.; Bhuyan, L.N., "Analysis of packet-switched multiple-bus multiprocessor systems," Computers, IEEE Transactions on, vol. 40, No. 3, pp. 352-357, Mar. 1991.

Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.

International Search Report, International Patent Application No. PCT/US07/75944, mailed Sep. 23, 2008, 3 pages.

European Search Report, European Patent Application No. 05106701.5, mailed Oct. 7, 2008, 5 pages.

European Search Report, European Patent Application No. 05109837.4, mailed Oct. 7, 2008, 5 pages.

Joe Jeddeloh, Fully Buffered DIMM (FB-DIMM), XP002490174, Advanced Systems Technology, Micron Technology, Inc. Apr. 16, 2008, 32 pages.

Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.

"Using Dual and Mappable Spare Bus", XP000433763, IBM Technical Disclosure Bulletin, vol. 37, No. 2B, IBM Copr., NY, US, Feb. 1, 1994, pp. 59-63.

"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.

European Search Report, European Patent Application 05106700.7, received Aug. 11, 2008.

* cited by examiner

SYSTEMS AND METHODS FOR PROVIDING REMOTE PRE-FETCH BUFFERS

BACKGROUND OF THE INVENTION

This invention relates generally to computer memory, and more particularly to systems and methods for providing remote pre-fetch buffers.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (I2C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. Nos. 5,513,135, 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels where populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

Contemporary computing systems may employ hub chip based memory systems, where memory devices (typically DRAM) are connected to memory hub devices. The memory hub devices are interconnected to the system memory controller(s) via a network of communication channels. To facilitate high frequency signaling, the channels are generally comprised of one or more unidirectional outputs (downstream) and a unidirectional input (upstream) point-to-point links. Processing and/or input/output (I/O) requests (including address, read/write indication and/or any other attributes) to access the system memory (referred to as access requests) are serviced by the system memory controller(s). The memory controller translates and regulates the access requests. The memory controller schedules and prioritizes the requests to the available memory banks for optimal system performance. The requests are specifically encoded according to the channel protocol (or associated interface protocol) and transmitted to the selected memory hub devices via the downstream link(s). Write requests include data associated with the write request, but not necessarily sent in the same packet. Read requests imply an expected data reply that will be transferred back to the memory controller via the one or more subsequent upstream packets. The targeted hub device(s) translate received requests and responsively control the attached memory devices to store write data from the hub, or provide read data to the hub.

The memory controller data read access latency can be mitigated by having a pre-fetch buffer associated with the memory controller. A pre-fetch buffer generally consists of a small associative cache, with one or more logical entries for storing data, associated address information, and other attributes. The memory controller can autonomously speculatively read and/or responsively read data from the memory devices for the purpose of storing the data into the pre-fetch buffer for lowest latency to anticipated future requests.

Hub based memory systems that employ pre-fetch buffers within a hub device to mitigate the latency associated with directly accessing the memory devices have been described (see, for example, U.S. Publication Number US2004/0260909 to Lee, et al.). However, this scheme incurs significant latency associated with the memory controller communicating with the hub device(s) to reference pre-fetch data stored within the hub. Having a pre-fetch data cache in the memory controller mitigates the access latency associated with implementing such buffers in the remote hub devices. However, both of these techniques require the use of critical output and input channel resources to transport data from the memory devices to the pre-fetch buffers, often during periods of high contention for these resources. Therefore, a need exists for a more efficient hub-based memory system to improve computing performance through lower memory latency and higher memory throughput.

BRIEF SUMMARY OF THE INVENTION

Embodiments include a computer memory system with a memory controller, one or more memory busses connected to the memory controller, and at least one memory subsystem in communication with the memory controller via the memory busses. The memory controller generates, receives and responds to memory access requests including unsolicited data transfers. The memory subsystem includes one or more memory devices and logic to initiate an unsolicited data transfer to the memory controller based on analysis performed at the memory subsystem of prior memory access requests received by the memory subsystem.

Embodiments also include a computer memory subsystem including pre-fetch logic and a hub device. The pre-fetch logic performs an analysis of prior memory access requests to one or more memory devices in communication with the memory subsystem. The pre-fetch logic also initiates an unsolicited data read to one or more of the memory devices based on results of the analysis. The hub device is in communication with a memory bus for initiating an unsolicited data transfer to a memory controller. The unsolicited data transfer includes data returned by the unsolicited data read.

Embodiments also include a memory controller for generating, receiving, and responding to memory access requests. The memory controller includes a local pre-fetch data cache and unsolicited data transfer logic for facilitating processing of unsolicited data transfers from a memory subsystem. The processing includes receiving a data packet and identifying the data packet as an unsolicited data packet. The unsolicited data packet includes data from an address range. The processing also includes verifying that the data at the address range has not been overwritten by a subsequent write command to the address range. The contents of the unsolicited data packet are stored in the local pre-fetch data cache in response to verifying that the data at the address range has not been overwritten by a subsequent write command to the address range.

Embodiments further include a method for receiving and responding to memory access requests including receiving a data packet at a memory controller. The data packet is identified as being an unsolicited data packet and includes an address range. It is verified that the data at the address range has not been overwritten by a subsequent write command to the address range. The contents of the unsolicited data packet are stored in a local pre-fetch data cache in response to verifying that the data at the address range has not been overwritten by a subsequent write command to the address range.

Embodiments further include a method of driving unsolicited data packets in a memory system including analyzing prior memory access requests to one or more memory devices, the analyzing performed at a memory module. A data read command is initiated at an address range on one or more of the memory devices based on results of the analyzing. An unsolicited data packet is transmitted to a memory controller when an upstream bus is idle. The unsolicited data packet includes data returned by the data read command.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
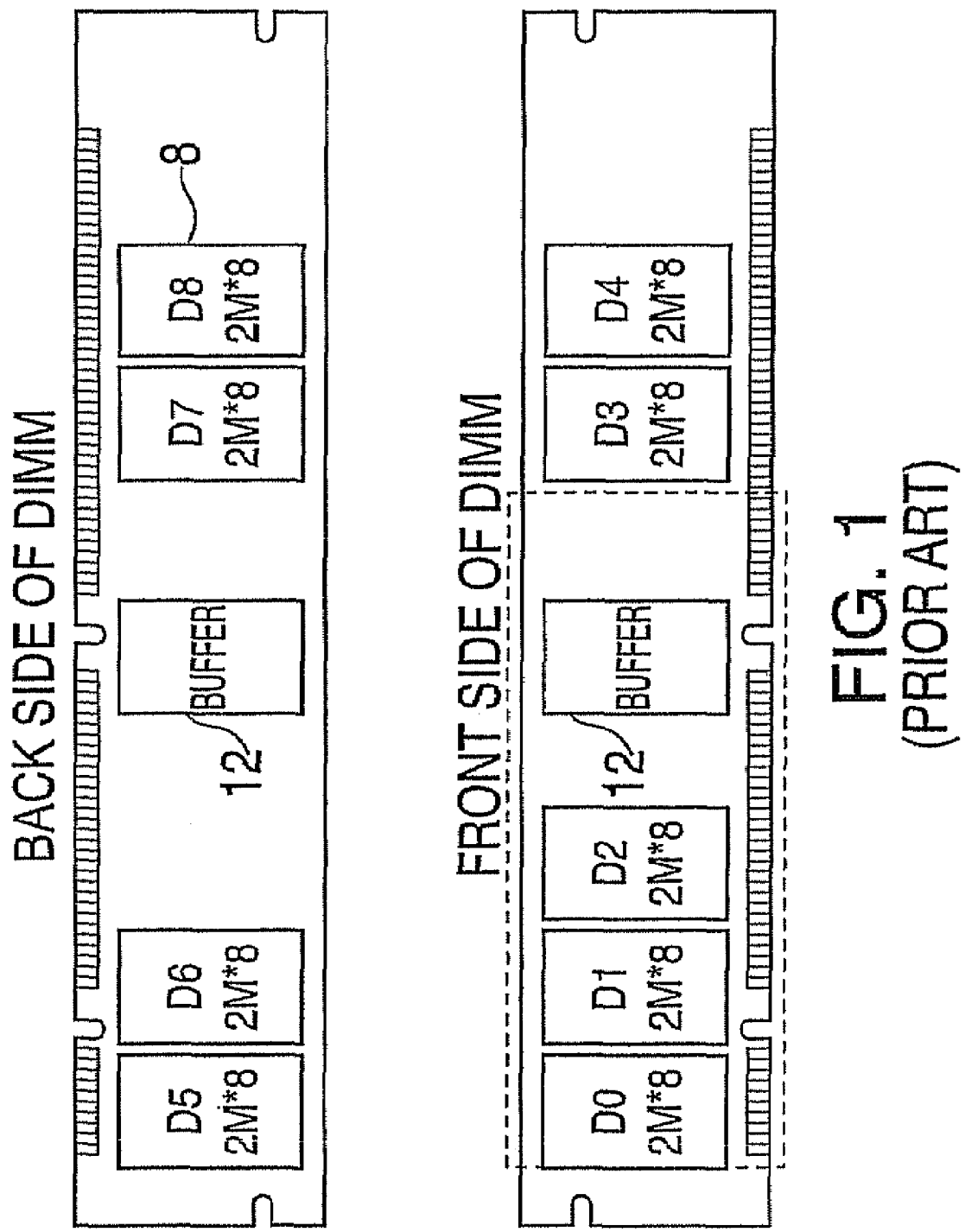
FIG. 1 depicts an exemplary early synchronous memory module.
Figure 2:
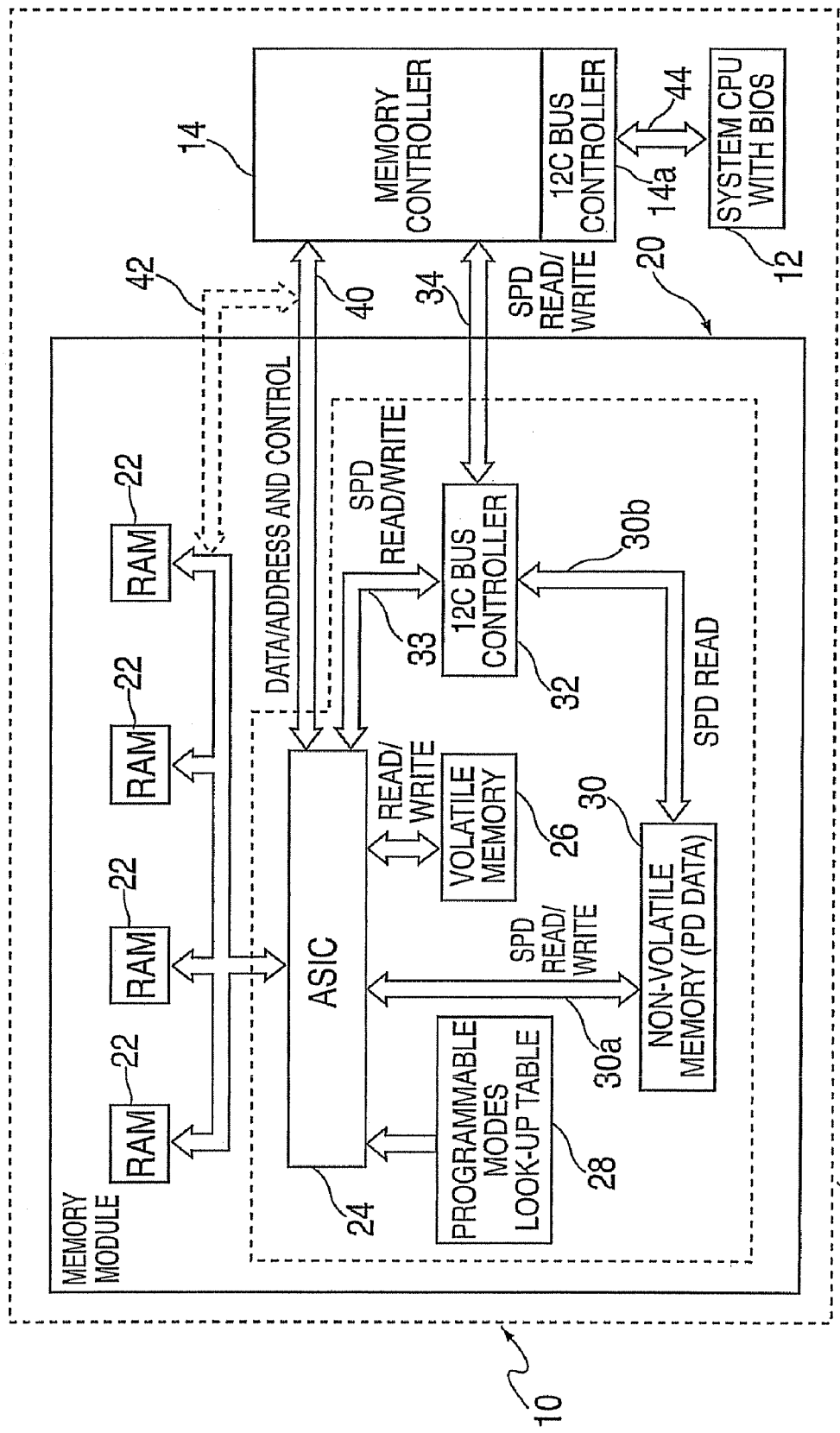
FIG. 2 depicts an exemplary computer system with a fully buffered synchronous memory module that is directly connected to a memory controller.
Figure 3:
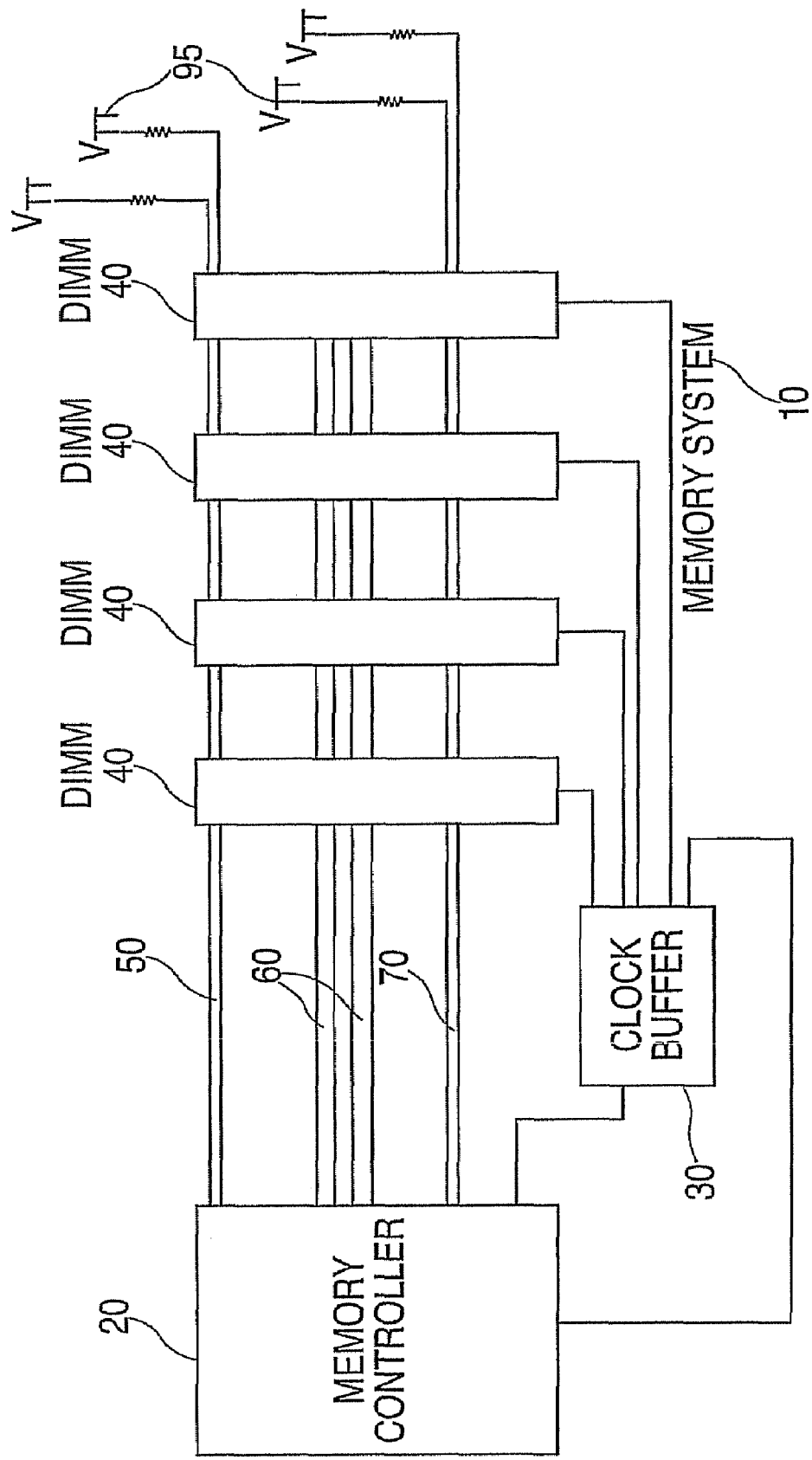
FIG. 3 depicts an exemplary memory system, shown with a single, traditional multi-drop stub bus.
Figure 4:
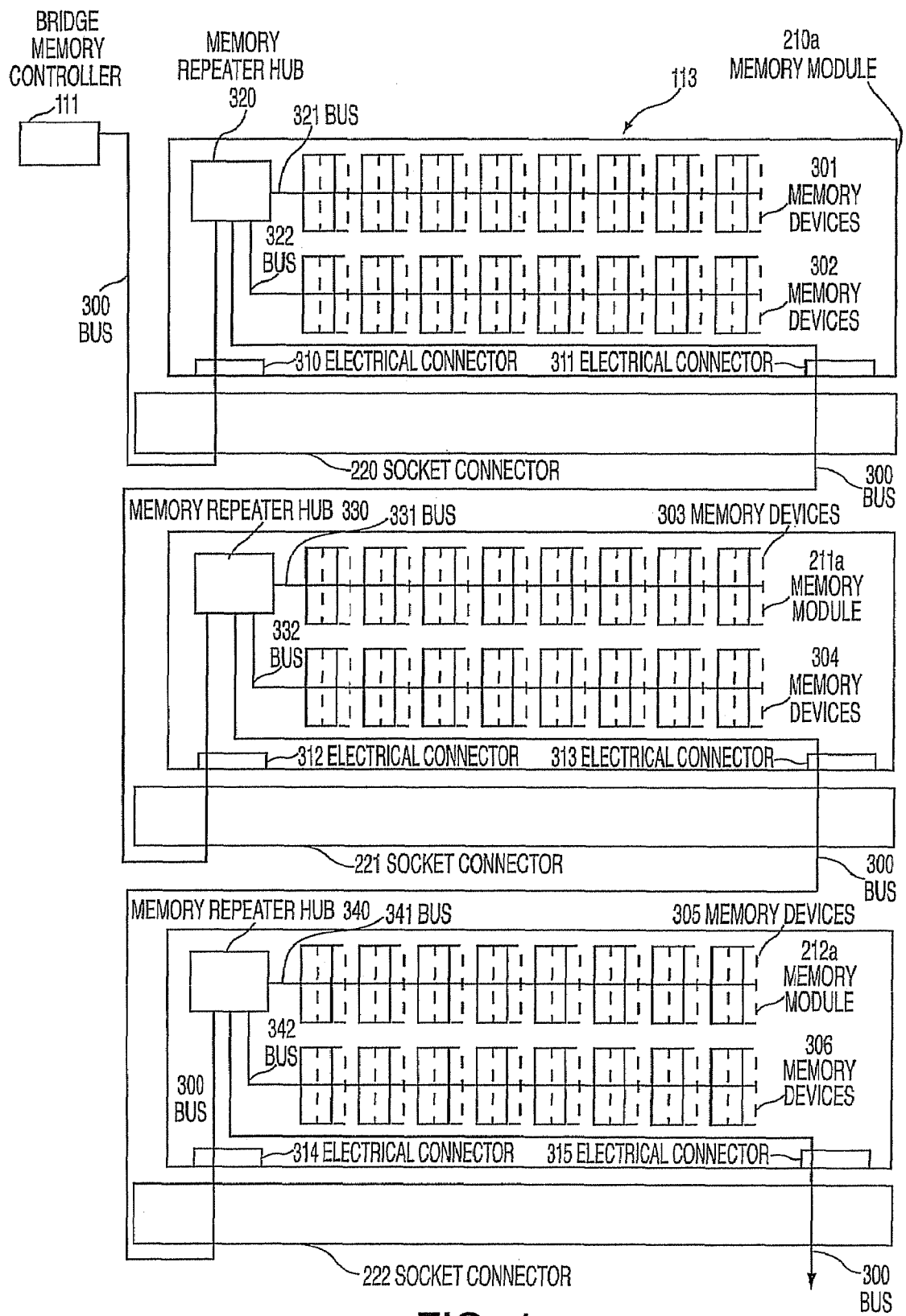
FIG. 4 depicts a fully buffered synchronous memory module and system structure, where the fully buffered synchronous memory module includes a repeater function.

Exemplary embodiments include a computer memory system that includes one or more memory hub devices, with each hub device being connected to one or more memory devices. A memory controller directs requests to access the memory devices via channel(s) interconnecting the memory controller and the hub devices. Each hub device can pre-fetch data and send it to the memory controller as an unsolicited "read" reply. In exemplary embodiments, the sending of the pre-fetch data occurs on the channel during idle periods. The memory controller maintains a local set of "pre-fetch" data buffers (data cache) within the controller for storing the received pre-fetch data. Memory access requests are first compared to the local pre-fetch buffer contents, and are serviced directly from the local pre-fetch buffer when the address is valid, precluding the need to utilize the memory devices, hub devices and/or channels to access the data.

Exemplary embodiments include a computing system with a processor(s) and an I/O unit(s) (e.g., requestors) interconnected to a memory system that contains a memory controller and memory devices. The computer memory system includes a physical memory array with a plurality of memory devices for storing data and instructions. These memory devices may be connected directly to the memory controller and/or indirectly coupled to the memory controller through hub devices. In exemplary embodiments, the hub-based computer memory system has memory devices attached to a communication hub device that is connected to a memory control device (e.g., a memory controller). The hub device may be connected to the memory controller through a multi-drop or point-to-point bus structure (which may further include a cascade connection to one or more additional hubs). Memory access requests are transmitted by the memory controller through the bus structure to the selected hub(s). In response to receiving the memory access requests, the hub device translates the memory access requests to control the memory devices to store write data from the hub device or to provide read data to the hub device. Read data is encoded into one or more communication packet(s) and transmitted through the bus(ses) to the memory controller.

In exemplary embodiments, a pre-fetch data cache is contained within the memory controller, and/or may be logically partitioned from the cache hierarchy between the requestor(s) and the memory controller. The memory controller can autonomously (self-initiate accesses, without direction from the processor or another system element), speculatively (initiate an access based on a historical accesses and in response to a local algorithm) and/or responsively read data from the memory devices for the purpose of storing the data into the pre-fetch data cache for lowest latency to anticipated future requests. In any case, there is an implied data reply from the hub device with the data associated with the read request.

Exemplary embodiments include a new network packet and associated protocol for having an unsolicited data packet from the hub device received at the memory controller. An unsolicited data packet refers to a data packet that is not associated with a read request from the memory controller (i.e., is not a "solicited" data packet). An unsolicited data packet is used by the hub device to forward unsolicited pre-fetch data to the pre-fetch data cache in the memory controller.

Figures 5, 6:
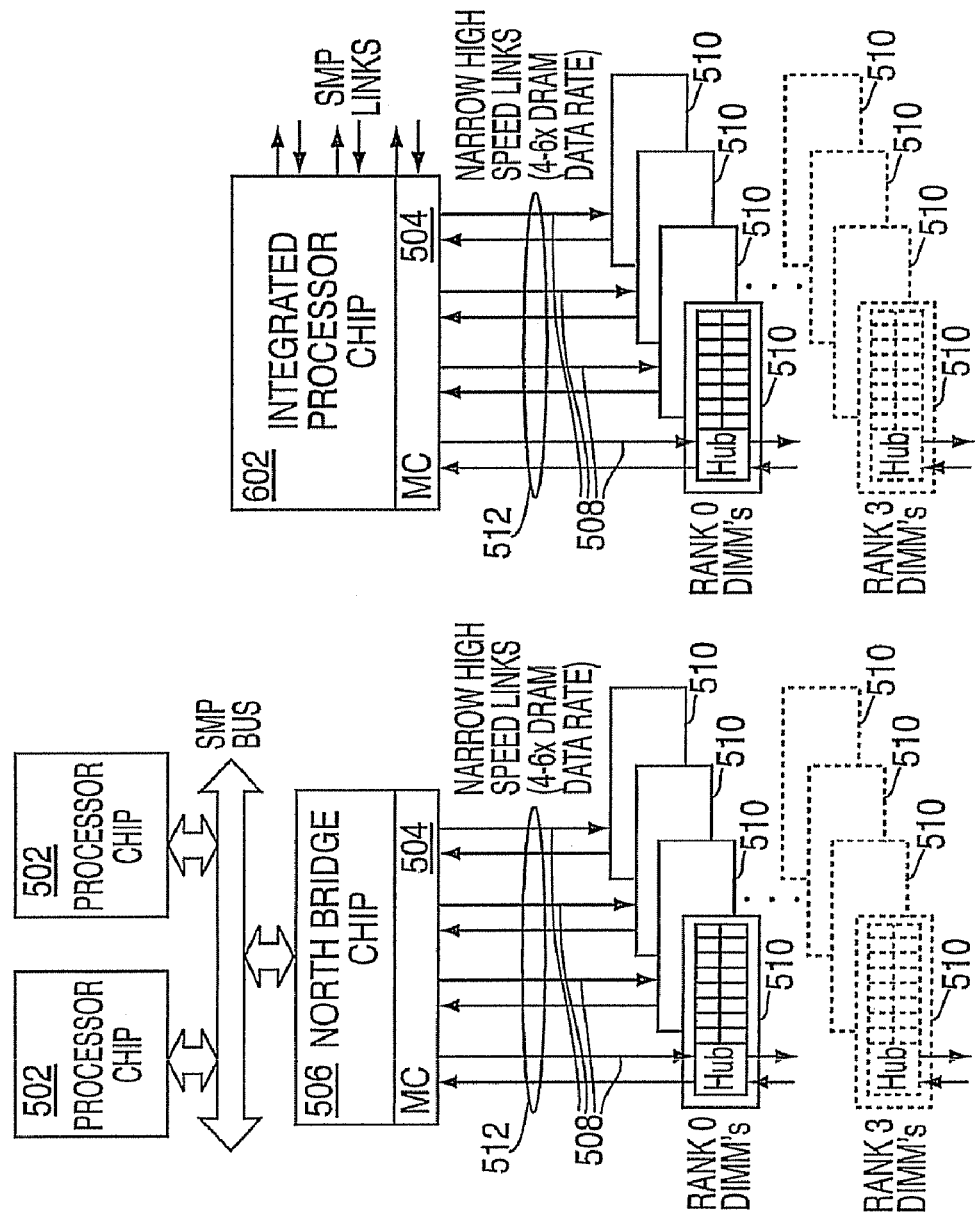
FIG. 5 depicts a block diagram of multiple independent daisy-chained memory interface channels that operate in parallel to support data access requests.
FIG. 6 depicts a block diagram of multiple independent daisy-chained memory interface channels that operate in parallel to support data access requests.

FIG. 5 depicts a contemporary system composed of two processors 502 which share a common memory controller 504. The common memory controller is integrated into a "north bridge chip" 506. In the configuration depicted in FIG. 5, multiple independent daisy-chained memory interface busses 508 are logically aggregated together to operate in unison to support a single independent access request at a higher bandwidth with data and error detection/correction information distributed or "striped" across the parallel busses and associated devices. The memory controller 504 attaches to four narrow/high speed point-to-point memory busses 508, with each bus 508 connecting one of the several unique memory controller interface channels to a daisy-chained memory subsystem 510 (or memory module) which includes at least a hub device and one or more memory devices. Some systems further enable operations when a subset of the memory busses 508 are populated with memory subsystems 510. In this case, the one or more populated memory busses 508 may operate in unison to support a single access request.

FIG. 6 depicts a contemporary system composed of an integrated processor chip 602, which contains one or more processor elements and an integrated memory controller 504. The operation of the system depicted in FIG. 6 is fundamentally identical to that of FIG. 5, with the integrated processor chip 602 in FIG. 6 representing the two processors 502 and the north bridge chip 506 in FIG. 5.

In alternate exemplary embodiments, the memory controller(s) 504 may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

Figure 7:
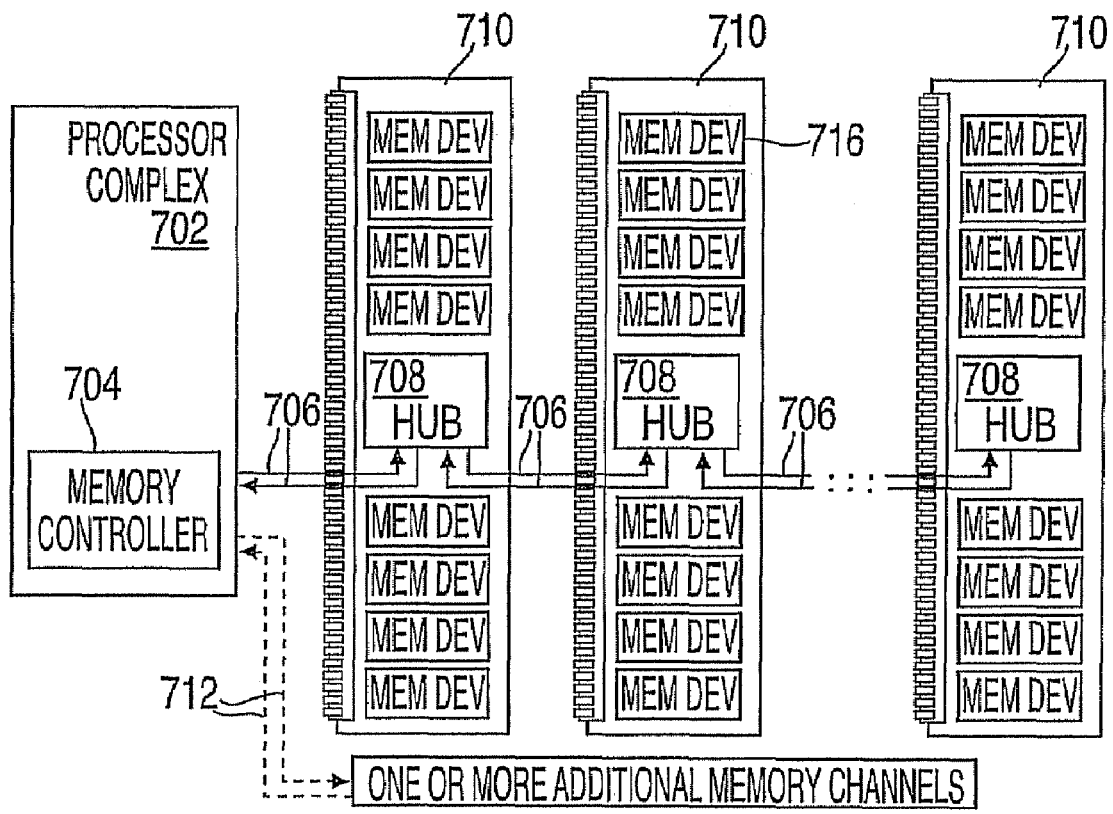
FIG. 7 depicts a memory system having one or more memory channels and memory controllers interconnected by one or more cascade interconnect buses that may be implemented by exemplary embodiments.

Exemplary embodiments apply to memory systems constructed of one or more memory subsystems, generally in the form of memory modules with hub logic chips, or buffer devices, which are connected to a processor complex by a cascade interconnect bus 706 as depicted in FIG. 7. In alternate exemplary embodiments, the memory modules 710 (also referred to as memory subsystems due to the inclusion of memory devices 716 and associated memory interface circuitry, in for example a hub logic chip 708) are connected to the processor complex 702 by one or more busses 706. The memory modules 710 depicted in FIG. 7 contain both a hub logic chip 708 that contains remote prefetch logic and a first interface to the memory controller 704 in the processor complex 702 (containing one or more processors) via a cascade-interconnect memory bus 706 (shown in the exemplary embodiment as including an upstream bus and a downstream bus). The memory modules 710 also include one or more memory devices 716 that are connected to the hub logic chip 708 via a second interface. A third interface may also exist on the hub logic chip 708, especially in the case of a cascade interconnect bus 706, to re-drive information such as address, command and data information to one or more memory modules 710 located downstream from the first memory module 710, as well as to receive and re-drive data and/or error, status and other operational information intended for an upstream memory module 710 or the main memory controller 704.

The memory modules 710 may be implemented in a variety of technologies including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins.

In exemplary embodiments, the memory bus 706 is constructed using multi-drop connections to the memory modules 710 and/or using point-to-point connections. The downstream portion of the controller interface (or memory bus 706), referred to as the downstream bus, may include command, address, data and other operational, initialization or status information being sent to the memory modules 710. Each memory module 710 may simply forward the information to the subsequent module(s) 710 via bypass circuitry; receive, interpret and re-drive the information if it is determined to be targeting a downstream memory module 710; re-drive some or all of the information without first interpreting the information to determine the intended recipient; or perform a subset or combination of these options.

The upstream portion of the memory bus 706, referred to as the upstream bus, returns requested read data and/or error, status or other operational information, and this information may be forwarded to the subsequent memory module(s) 710 via bypass circuitry; be received, interpreted and re-driven if it is determined to be targeting an upstream memory module 710 and/or memory controller 704 in the processor complex 702; be re-driven in part or in total without first interpreting the information to determine the intended recipient; or perform a subset or combination of these options.

Exemplary embodiments may be utilized by a single level memory system having only a single memory module 710, or memory subsystem, which is directly connected (such as via one or more point-to-point interconnections) to the main memory controller 704, with or without additional memory subsystem positions connected in a cascade interconnect or multi-drop structure. In additional exemplary embodiments, the main memory controller 704 includes more than one memory channel (see for e.g., bus 712 in FIG. 7), with each memory channel often comprised of one or more upstream and downstream buses 706 and 712 operating in a like manner; with the memory controller 704 operating in a parallel or independent manner for each memory bus 706 and 712; and/or with each memory bus 706 and 712 including the same or a different number of installed memory modules 710.

In exemplary embodiments, the memory system includes more than one memory module 710, with subsequent memory modules 710 communicating to the controller 704 by way of and/or independent of the first memory module 710. In exemplary embodiments, such as the one depicted in FIG. 7, the memory controller 704 is in communication with the first memory module 710 via a point-to-point bus, with the bus cascade-connected to a second (subsequent) memory module 710 via re-drive circuitry in the first memory module 710 (e.g., via circuitry in the hub logic chip 708). Third and fourth (and greater) memory modules 710 may be connected via a similar method, with the re-drive circuitry included in the memory module 710 located prior to that memory module 710 in the memory bus 706.

In alternate exemplary embodiments, the point-to-point bus includes a switch or bypass mechanism which results in the bus information being directed to one of two or more possible memory modules 710 during downstream communication (communication passing from the main memory controller 704 to a memory module 710), as well as directing upstream information (communication from a memory module 710 to the memory controller 704), often by way of one or more upstream memory modules 710. Further embodiments include the use of continuity modules, such as those recognized in the art, which, for example, can be placed between the memory controller and a first populated memory module, in a cascade interconnect memory system, such that any intermediate module positions between the memory controller and the first populated memory module include a means by which information passing between the memory controller and the first populated memory module position can be received even if the one or more intermediate module position(s) do not include a memory module. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate memory module is removed and replaced by a continuity module, such that the system continues to operate after the removal of the intermediate memory module. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more memory modules 710 connected to the memory controller 704 via a cascade interconnect memory bus 706, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in FIG. 7, the memory modules 710 may also include a separate bus, such as a 'presence detect' bus, an I2C bus and/or an SMBus which is used for one or more purposes including the determination of the memory module attributes (generally after power-up), the reporting of fault or status information to the system, the configuration of the memory subsystem(s) 710 after power-up or during normal operation or other purposes. Depending on the bus characteristics, this bus might also provide a means by which the valid completion of operations could be reported by the memory module(s) 710 to the memory controller(s) 704, or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device 708, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Figure 8:
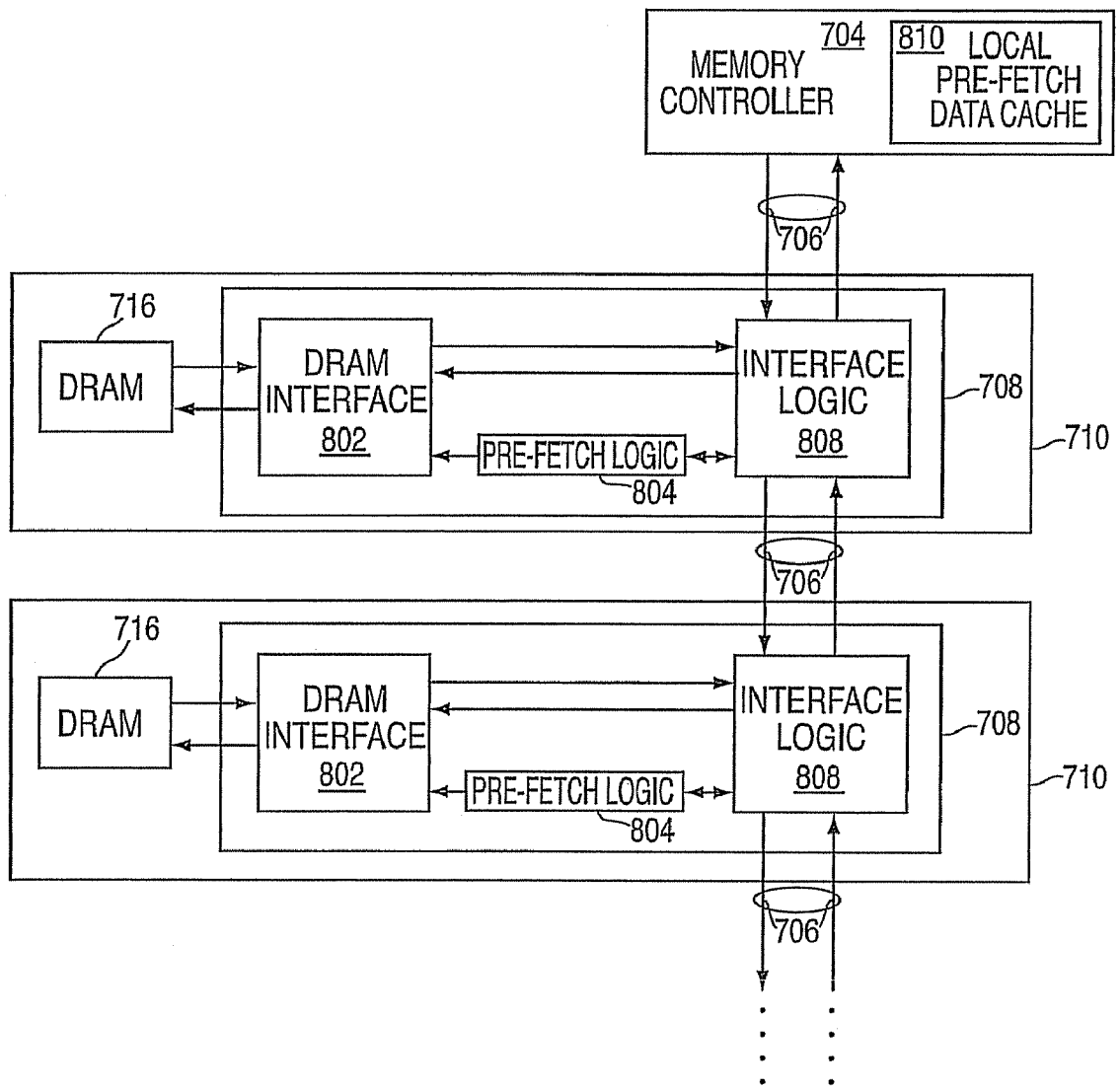
FIG. 8 is a block diagram of a memory system that may be implemented by exemplary embodiments.

FIG. 8 is a block diagram of a memory system that may be implemented by exemplary embodiments. The system depicted in FIG. 8 is similar to the system depicted in FIG. 7, with FIG. 8 depicting elements in the hub device 708 and memory controller 704 that may be utilized to implement exemplary embodiments. The memory controller 704 includes a local pre-fetch data cache 810, although this cache may also be logically partitioned from the existing cache hierarchy between the requestors (e.g. processor(s)) and the memory controller. In exemplary embodiments, the local pre-fetch data cache 810 is managed according to policies established by the computing environment. In further embodiments, the local pre-fetch data cache is managed by the memory controller 704 according to the buffer replacement policy and coherency dependencies with respect to outstanding read and write requests.

The hub device 708 includes interface logic 808, pre-fetch logic 804 and a DRAM interface 802. The pre-fetch logic 804 is utilized to monitor accesses to the memory devices from the memory controller 704. Based on access patterns by the memory controller 704, the pre-fetch logic 804 determines if a pre-fetch should be performed at the hub device 708. In an exemplary embodiment, pre-fetch requests would include the next sequential address or stride address, based on the historical system access pattern—although other pre-fetch algorithms could be applied based on the system design and/or programming. As used herein, the term stride address implies that the next address will be a distance from the previous address that is consistent with historical address spacings and not necessarily an adjacent address. Any suitable pre-fetch algorithm may be implemented by the pre-fetch logic 804 on the hub device 708. In exemplary embodiments, if the pre-fetch logic 804 determines that data should be pre-fetched, then it directs the DRAM interface 802 to read the data. In alternate exemplary embodiments, the pre-fetch logic 804 directs the interface logic 808 to read the data and the interface logic requests the data from the DRAM interface 802.

The interface logic 808 includes standard interface logic functions in addition to logic that is utilized to transmit the unsolicited pre-fetch data to the memory controller 704 as described below in reference to FIG. 9. In alternate exemplary embodiments, the pre-fetch logic includes the instructions that are utilized to transmit the unsolicited pre-fetch data to the memory controller 704 as described below in reference to FIG. 9. In alternate exemplary embodiments, the memory devices 716 and/or hub devices 708 include a pre-fetch data cache for storing the pre-fetch data (also referred to herein as the data returned by the unsolicited data read) locally before transmitting it to the memory controller 704.

Figure 9:
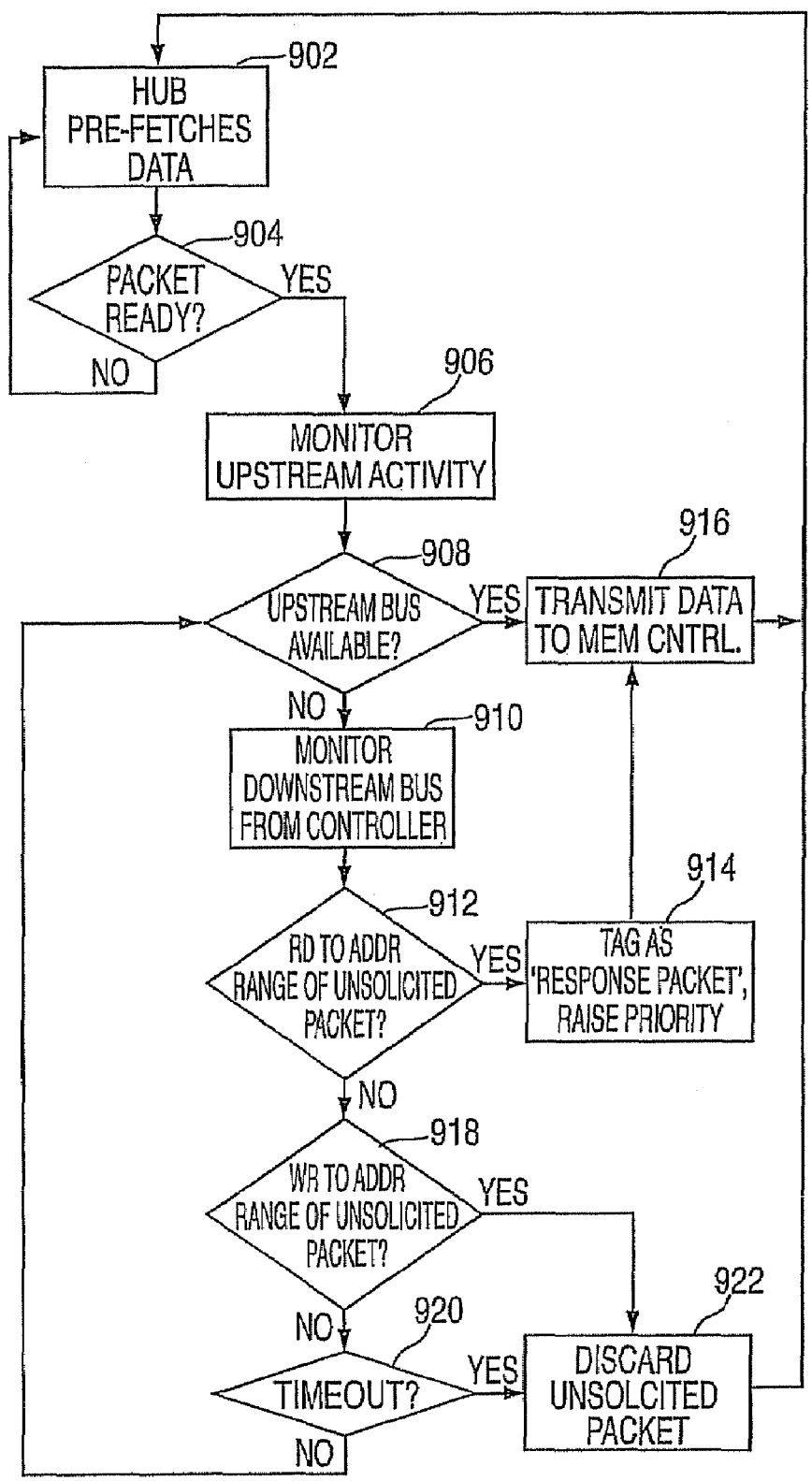
FIG. 9 is a process flow for operations performed at a hub device following the pre-fetching of unsolicited data that may be implemented by exemplary embodiments.

FIG. 9 is a process flow for operations performed at the hub device 708 following the pre-fetching of unsolicited data that is implemented by exemplary embodiments. The processing flow may be implemented by adding additional functions to the interface logic 808 in the hub device 708 or by adding separate pre-fetch logic 804 to the hub device 708. As used herein, the term "logic" refers to computer instructions that are implemented by hardware and/or software. At block 902, the hub device 708 (e.g., the pre-fetch logic 804) monitors accesses to the memory devices 716 by the memory controller 704. Based on an algorithm in the hub device 708 (e.g., the pre-fetch logic 804) and in response to prior accesses by the memory controller 704, data may be pre-fetched by the hub device 708 at block 902. Again, pre-fetch algorithms are well known in the art, and any suitable algorithm may be utilized by exemplary embodiments. Once the read operation to the memory device(s) 716 is completed, one or more packets are prepared for transmission to the memory controller 704. At block 904, it is determined if an access is complete and a packet is ready for transmission to the memory controller 704. In exemplary embodiments, a memory access will result in a cache line transfer (e.g. 64 bytes of 128 bytes) and the transmission of one or more packets to the memory controller is not initiated until data equal to the size of the cache line has been pre-fetched from the memory device(s) 716; however, other transfer and packet sizes may be utilized, depending on the application, and the transfer may be comprised of one or more packets. Block 902 is performed and the hub pre-fetches data until at least the minimum information associated with the first of one or more intended packet(s) is available. A variety of transfer or packet sizes can be used, based on the system design objectives, with FIG. 11 relating to an exemplary embodiment. The tag that accompanies the transfer identifies the type of transfer it is, and therefore the number of bits/bytes/packets associated with the transfer.

If a packet is ready for transmission to the memory controller 704, as determined at block 904, then block 906 is performed. At block 906, the activity on the upstream bus is monitored by the hub device 708 (e.g., by the interface logic 808). At block 908, it is determined if the upstream bus is available to enable transmission of the unsolicited data packet. Generally, the upstream bus is available if there is a period of inactivity on the upstream bus and there are no other higher priority packets to be sent upstream from the hub device 708. If the upstream bus is available, then block 916 is preformed and the hub device 708 transmits the data packet to the memory controller 704, in conjunction with a tag which identifies the data (e.g. the address range and module identification). In this manner, the unsolicited data is sent, typically at a low priority, to the memory controller 704. Processing then continues at block 902. In conventional cascade interconnect memory systems, interface logic 808 is responsible for the merging of local information onto the cascade interconnect bus, although the memory controller schedules accesses such that the bus will be idle at the time the information is prepared for transmission to the memory controller, for the duration of the transfer. In the exemplary embodiment, interface logic 808 will initiate an upstream transfer to the controller at a time based on the application settings and transfer priority, and may temporarily delay or otherwise interrupt transfers in flight from downstream modules.

If the upstream bus is not available, as determined at block 908, then block 910 is performed and the hub device 708 monitors accesses directed to that hub device 708 on the downstream bus to determine if any accesses are directed to the same address range as the unsolicited data packet(s) currently available and waiting to be sent to the memory controller 704 on the upstream bus. If it is determined, at block 912, that a read operation is received that matches the address range of the available unsolicited packet, then block 914 is performed. At block 914, the tag associated with the unsolicited packet is modified to indicate the packet is a response packet and the priority is raised commensurate with the new packet identification. Then, block 916 is performed to merge the packet onto the upstream data bus once any current transfers from that hub device 708 are completed, with the merge also being consistent with the read priority algorithm.

If it is determined, at block 918, that a write operation has been received that matches the address range of the available unsolicited packet, then block 922 is performed. At block 922, the packet is discarded because the pre-fetch data is no longer valid, and processing continues at block 902 where the hub device 708 continues to monitor accesses for optimal pre-fetches. Upon completion of an unsolicited pre-fetch from the memory device(s) 716, the timeout counter is set to a pre-defined time limit for retaining the packet(s) (e.g., twenty clock cycles, thirty clock cycles) and begins to count down to zero. Once the packet(s) have aged to the pre-defined time limit (or have reached a pre-defined age), as determined at block 920, the timeout counter raises a flag, and any packet(s) associated with that timeout period that are not currently in the process of being sent to the memory controller 704 are discarded at block 922. The pre-defined time limit is a programmable (e.g., modifiable) number that may differ between hub devices 708. Processing then continues at block 902. If the timeout period has not been reached, then processing continues at block 908 to determine if the upstream bus is available 908 to transmit the packet. Although the steps in block 908, 910, 912, 918 and 920 are shown in an exemplary process flow, other process flows may be utilized, including a parallel flow (where read, write and timeout events are monitored in parallel) or a combination of series and parallel process flows (such as monitoring the timeout block 920 in parallel with completing read block 912 followed by write block 918) without straying from the fundamental teachings.

Figure 10:
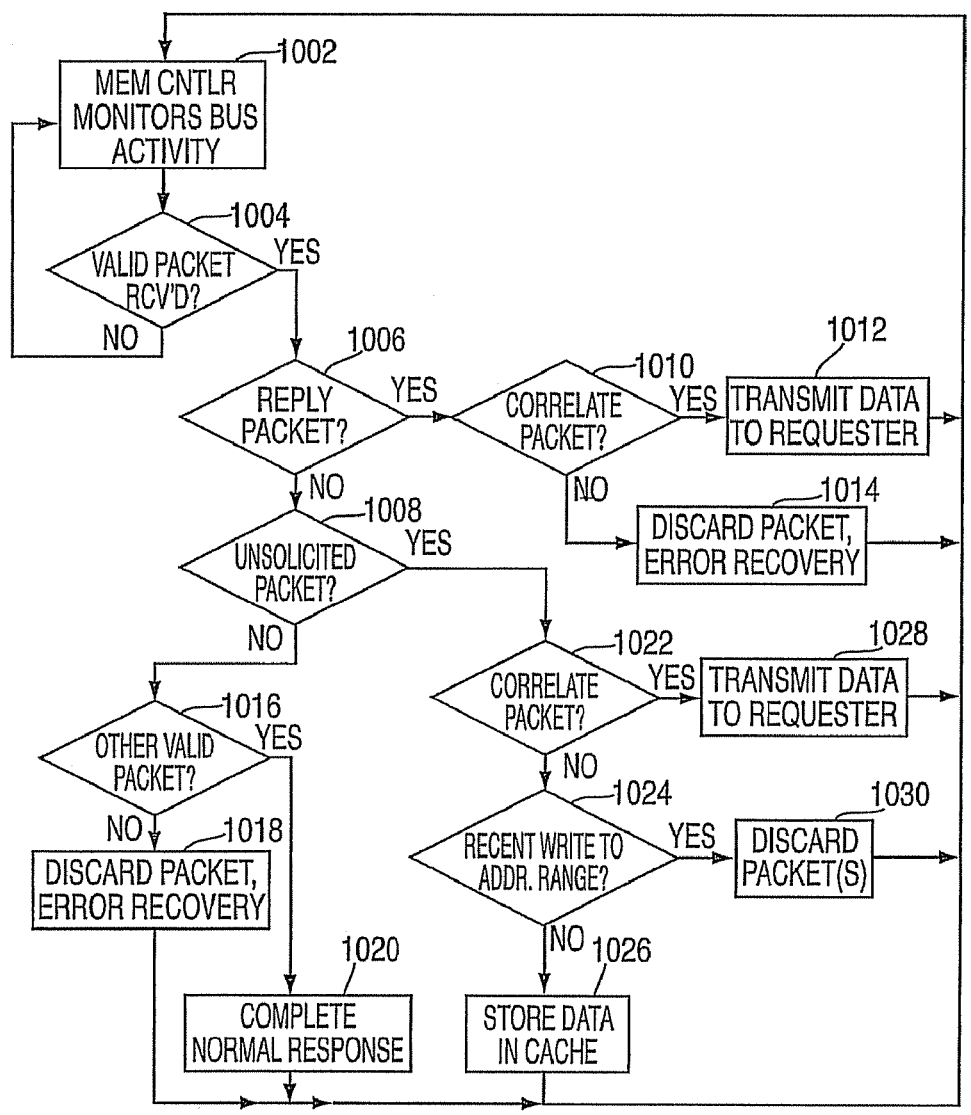
FIG. 10 is a process flow for operations performed at a memory controller following the receipt of an unsolicited read packet from a hub chip that may be implemented by exemplary embodiments.

FIG. 10 is an exemplary process flow for operations performed at the memory controller 704 following the receipt of one or more unsolicited read packets from one or more hub devices 708 resident in the memory system. At block 1002, the memory controller monitors all bus activity from the hub devices 708 on the memory modules 710 by interpreting the packets to determine if they contain header information identifying the packet as a solicited, status, unsolicited or other form of communication (e.g. one or more informational packets) from the one or more memory modules 710, or memory subsystems, resident in the memory system. At block 1004, it is determined if a valid packet has been received. In exemplary embodiments, the memory controller 704 looks at the first transfer(s) (or some number of bits) of the bus information (e.g., a header field) to determine if the information appears to include one or more valid packet(s). If the memory controller 704 does not identify the information on the bus 706 as comprising one or more valid data packet(s) at block 1004, then block 1002 is performed and the memory controller 704 continues to monitor activity on the upstream bus 706.

If the memory controller 704 identifies a transmission on the bus 706 as being some form of data packet(s) at block 1004, then block 1006 is performed to determine if the packet(s) are related to a reply to an access or other operation initiated by the controller. If the tag information attached to the packet(s) is decoded as a response to a solicited read request at block 1006, then block 1010 is preformed and the memory controller 704 compares the remaining tag information (e.g. address range and/or module identifier) to the pending read requests to verify the validity of the data. If the tag correlates to an outstanding read request, as determined at block 1010, then block 1012 is performed and the data is transferred to the requestor (e.g., to one or more processors) at the next available time, based on the priority assigned to the read request, and the pending read request is retired. Processing then continues at block 1002. If the tag does not correlate to an outstanding read request, as determined at block 1010, then block 1014 is performed and the packet(s) are discarded and an error flag is generated for servicing by the processor or alternate error recovery system. Block 1014 is performed when the packet(s) appears to be a valid response packet, but does not correlate to an outstanding read request (e.g., the address or module identifier does not match outstanding read requests). In this case, the memory controller 704 discards the packet and then attempts to figure out why the error occurred by performing error recovery (e.g., channel diagnostics). Upon resolution of the error condition, in parallel with the diagnostics or immediately upon discarding the invalid packet(s) (e.g. due to a decision to delay diagnostics until a later time), processing then continues at block 1002.

If the information on the bus 706 is identified as one or more valid packet(s) in block 1004, but does not correlate to an outstanding read or write request to that address range as determined at block 1006, then block 1008 is performed and the packet(s) are evaluated to determine if the packet(s) is an unsolicited data packet(s). If the packet(s) is determined to be an unsolicited read packet at block 1008, then block 1022 is performed and the memory controller 704 double checks and once again compares the tag information to determine if the request correlates to a recent read request. If the packet(s) is found to correlate to a read request at block 1022, then block 1028 is performed and the solicited read request is transmitted to the requestor in a manner that is functionally similar to the processing in block 1012. Processing then continues at block 1002.

If it is determined, at block 1022, that the packet(s) does not correlate to a read request, then block 1024 is performed. At block 1024 it is determined if the packet(s) relates to a recent write operation to that address range, and if the tag confirms that the data is older than the previous write to that address range, then block 1030 is performed and the packet(s) is discarded because the data is out of date. Updating the local cache with this data would result in out of date (or incorrect) data being stored in the local cache and thus a lack of data coherency. Processing then continues at block 1002. If no outstanding read or write request is identified for the address range, then block 1026 is performed and the packet(s) is added to the local pre-fetch data cache 810, in conjunction with the address information, consistent with a local pre-fetch data cache control algorithm. Processing then continues at block 1002.

If the packet(s) is determined not to be one or more unsolicited read packet(s) at block 1008, then the received packet(s) are neither solicited nor unsolicited read packet(s) and the packet(s) may consist of other valid communication(s) from one or more hub devices 708 to the memory controller 704. At block 1016, the packet(s) is evaluated to determine if the information in the data packet(s) is associated with status, failure recovery or other actions, in which case block 1020 is preformed and the memory controller 704 takes action consistent with the design or programming of the system. Alternatively, block 1018 is performed if the packet(s) is determined to be a valid packet(s), but the contents are indeterminate or otherwise invalid. In this case, the memory controller 704 discards the packet and then attempts to figure out why the error occurred by performing error recovery (e.g., channel diagnostics). Upon resolution of the error condition, in parallel with the diagnostics or immediately upon discarding the invalid packet(s) (e.g. due to a decision to delay diagnostics until a later time), processing then continues at block 1002

Upon responding to the received transmission, in parallel with the execution of a response to the current packet(s) or immediately after initiating operation in response to the current packet, the memory controller 704 continues to monitor the bus 706 for incoming solicited or unsolicited packets at block 1002. The processing depicted in FIGS. 9 and 10 represent a logical process flow. The actual physical implementation of the processes may be different (e.g., some process blocks performed in parallel) as long as the physical implementation achieves the same results as those depicted in FIGS. 9 and 10.

Figure 11:
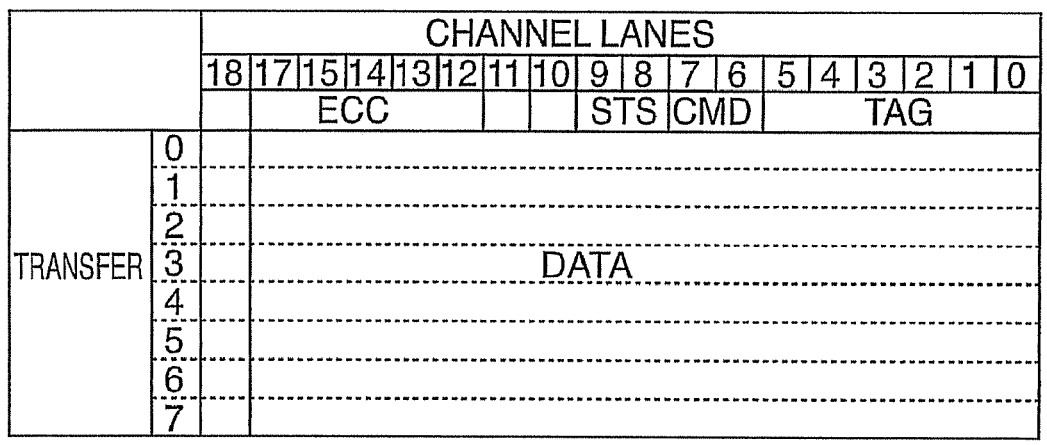
FIG. 11 depicts a packet structure that may be implemented by exemplary embodiments.

FIG. 11 depicts an exemplary upstream data packet, which could be sent by one or more of the memory modules 710, via the cascade interconnect memory bus 706, to the memory controller 704. In exemplary embodiments, the unsolicited data transfer(s) from the hub device 708 to the memory controller 704 is formatted as a data packet. The exemplary data packet depicted in FIG. 11 includes nineteen bit lanes and one header and eight data transfers, yielding a total of one hundred and seventy one bit positions. Other exemplary packets may have more or less bit lanes and more or less transfers, and may include one or more spare bit lanes, based on the application requirements and/or conditions. The packet header is shown under the channel lane numbers, and defines the location of the tag (bits 0-5), command (CMD) bits (6-7), status (STS) bits (8-9), ECC bits (12-17), and other lanes which may be used for functions such as interrupts, spare bit lanes, CRC, data and other information that might apply to a given application. In exemplary embodiments, the tag is utilized, as described above in reference to FIG. 10, by the memory controller 704 to identify reply packets, to identify unsolicited pre-fetch data packets and to identify other types of packets received at the memory controller 704. The subsequent transfers (identified as transfers 0-7) refer to the data transfers that follow the header, and in the exemplary embodiment include 18 bit lanes, identified as 0 through 17, and 8 transfers, identified as 0 through 7, comprising a total of 144 bit positions (e.g. 16 bytes of data plus the associated EDC check bits). An additional bit lane is shown (shown as column 18 of FIG. 11), which may be used for such purposes as a spare bit lane.

The locations, count and function of each of the defined bit positions may also vary from what is described. In one case, an upstream data transfer packet might consist exclusively of header and status information, comprising one or several transfers. This packet may be used to report completion of an operation such as a write command or refresh, report an error condition, report a status condition (such as module or device temperature) or provide other information that requires a limited number of bit positions/transfers. In another case, the full nine transfers may be included in the packet, which may provide data to the memory controller 704 associated with a read request initiated by the memory controller 704, data from a self-initiated read operation (initiated by the memory subsystem, or memory module 710), in conjunction with information such as ECC bits and/or CRC bits, status bits, tag bits and other information.

In many cases, one or more packet transfers will be required to provide the requested/required information to the memory controller 704 and/or processor(s) in the processor complex 702, with four or eight packets commonly used. The one or more packets may also include information associated with more than one requested operation. For example, a series of packets associated with a requested read to a second memory module 710 might be sent to the memory controller 704 by way of the upstream bus and a first memory module 710 located upstream from the second memory module 710 and prior to the memory controller 704. Upon receipt of the first of the one or more packets, the first memory module 710 might concatenate separate and independent tag and/or status information to the one or more packets traveling upstream, generally in locations pre-defined for this purpose, such that the resulting packets include information associated with two or more independent operations from one or more separate memory modules 710. In this manner, the utilization of the available bus bandwidth can be maximized by ensuring that all of the possible bit positions in the packet(s) are utilized. Examples of two independent operations might include the results of a read operation from a second memory module 710, to which status information is appended from a first memory module 710, such as a write operation completion status, a refresh completion status, a mode change status, environmental information such as temperature, or other information.

Although not shown in FIG. 11, exemplary downstream packets are structured in a similar manner, with multiple bit lanes and one or more transfers involved in the communication of command, address, data, status, initialization, priority flag(s) and other information from the memory controller 704 to the one or more memory modules 710 on the memory bus(es) 706. The downstream packet will often be included as a portion of a multi-packet transfer, with the bit lanes in each packet having the same or different functions based on the specific transfer and/or the packet number (such as the first packet of four packets or the eighth packet of eight total packets). This is also true for the upstream packet.

Memory devices, hubs, buffers, registers, clock devices, passives and other memory support devices and/or components may be attached to the memory subsystem, or memory module 710, via various methods including solder interconnects, conductive adhesives, socket structures, pressure contacts and other methods which enable communication between the two or more devices via electrical, optical or alternate means.

The one or more memory subsystem(s), or memory modules 710, may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

As used herein, the term memory subsystem refers to, but is not limited to: one or more memory devices; one or more memory devices and associated interface and/or timing/control circuitry; and/or one or more memory devices in conjunction with a memory buffer, hub, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules 710 described herein may also be referred to as memory subsystems because they include one or more memory devices 716 and a hub device 708.

Additional functions that may reside local to the memory subsystem, or memory module 710, include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) 716 are attached, or may be mounted to a separate interposer or substrate also produced using one or more of various plastic, silicon, ceramic or other materials which include electrical, optical or other communication paths to functionally interconnect the support device(s) to the memory device(s) 716 and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency(ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to implement a more efficient hub based memory system by to improving computing performance through lower memory latency and higher memory throughput. Exemplary embodiments include pre-fetch logic executing on the hub devices and the transmission of the pre-fetch data to the memory controller as unsolicited data packets with a tag identifying the packets as such. The memory controller then stores the unsolicited read data packet in its local cache, which results in the cache data being close to the processor for faster access (when compared with having to request it from the hub device). In exemplary embodiments, the data is transmitted to the memory controller as a low priority data packet when the bus is idle, thereby allowing for better utilization of the bus and for preventing the memory controller from having to utilize the downstream bus to request the pre-fetched data.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

I claim:

1. A computer memory system comprising:
   a memory controller for generating memory access requests to read data from two or more memory subsystems, receiving and responding to unsolicited data transfers from the two or more memory subsystems, the memory controller including pre-fetch data cache for storing pre-fetch data in anticipation of future data references, thereby eliminating sending one or more of the memory access requests to one or more of the memory subsystems when requested data is available in the pre-fetch data cache;
   one or more memory busses connected to the memory controller; and
   the two or more memory subsystems remote from the memory controller and in communication with the memory controller via the memory busses, each of the memory subsystems including one or more memory devices and pre-fetch logic to initiate an unsolicited data transfer to the memory controller based on access pattern analysis performed at the memory subsystem of prior memory access requests received by the memory subsystem from the memory controller, wherein the unsolicited data transfer includes a tag identifying the unsolicited data transfer as unsolicited, and the two or more memory subsystems include logic to modify the tag as a response in response to determining that a read operation has received which matches an address range of the unsolicited data transfer.

2. The memory system of claim 1 wherein the pre-fetch logic in the memory subsystem autonomously performs the analysis and initiates the unsolicited data transfer.

3. The memory system of claim 1 wherein the unsolicited data transfer includes address information associated with the data transfer.

4. The memory system of claim 1 wherein the unsolicited data transfer is initiated at a lower priority than a solicited data transfer.

5. The memory system of claim 1 wherein the memory controller includes logic to identify the unsolicited data transfer.

6. The memory system of claim 1, wherein the pre-fetch data cache is a logical partition of one or more caches in a hierarchy between the memory controller and one or more requesting devices and the pre-fetch data cache is coherently managed according to policies established for a computing environment.

7. The memory system of claim 6, wherein the pre-fetch data cache includes instructions to service a memory access request from the pre-fetch data cache without initiating an access request to the memory controller.

8. The memory system of claim 1, wherein the pre-fetch data cache is integrated within the memory controller and independently managed by the memory controller for replacement and coherency with respect to request traffic.

9. The memory system of claim 8, wherein the memory controller includes instructions to service a memory access request using data from the pre-fetch data cache in lieu of accessing the memory subsystem.

10. A computer memory subsystem comprising:
    pre-fetch logic to perform an analysis of prior memory access requests to one or more memory devices in communication with the memory subsystem and to initiate an unsolicited data read to one or more of the memory devices based on results of the analysis; and
    a hub device in communication with memory bus for initiating an unsolicited data transfer to a memory controller, the unsolicited data transfer including data returned by the unsolicited data read, the pre-fetch logic external to the memory controller wherein the unsolicited data transfer includes a tag identifying the unsolicited data transfer as unsolicited, and the hub device further comprises logic to modify the tag as a response in response to determining that a read operation has been received which matches an address range of the unsolicited data transfer.

11. The subsystem of claim 10 wherein the unsolicited data transfer includes address information associated with the unsolicited data read.

12. The subsystem of claim 10 wherein the unsolicited data transfer is initiated at a lower priority than a solicited data transfer.

13. The subsystem of claim 10 wherein the unsolicited data transfer is initiated during an idle period on the memory bus.

14. A method of driving unsolicited data packets in a memory system, the method comprising:
   analyzing prior memory access requests to one or more memory devices, the analyzing performed at a memory module;
   initiating a data read command at an address range corresponding to one or more of the memory devices, the initiating responsive to results of the analyzing; and
   modifying a tag in an unsolicited data packet to indicate that the unsolicited data packet is a response packet and raising a priority of the response packet;
   transmitting the unsolicited data packet on an upstream bus connecting the memory module to a memory controller, the unsolicited data packet including data returned by the data read command to the memory controller when the upstream bus is idle.

15. The method of claim 14 further comprising discarding the unsolicited data packet if a pending write request specifies the address range.

16. The method of claim 14 further comprising discarding the unsolicited data packet if the unsolicited data packet has aged beyond a limit and the upstream bus is not idle.

17. The method of claim 14 further comprising monitoring activity on the upstream bus.

* * * * *